United States Patent

Huang et al.

(10) Patent No.: US 10,390,384 B2
(45) Date of Patent: Aug. 20, 2019

(54) APPARATUSES AND METHODS FOR REDUCING CIRCUIT SWITCH FALLBACK (CSFB) CALL SETUP TIME

(71) Applicant: MediaTek Inc., Hsinchu (TW)

(72) Inventors: Yu-Cheng Huang, Taipei (TW); Chien-Chun Huang-Fu, Hsinchu (TW); Yu-Syuan Jheng, Taipei (TW); Jou-Man Lin, Taipei (TW)

(73) Assignee: MediaTek Inc., Hsinchu (TW)

( * ) Notice: Subject to any disclaimer, the term of this patent is extended or adjusted under 35 U.S.C. 154(b) by 161 days.

(21) Appl. No.: 15/138,720

(22) Filed: Apr. 26, 2016

(65) Prior Publication Data

US 2016/0323931 A1 Nov. 3, 2016

Related U.S. Application Data

(60) Provisional application No. 62/160,826, filed on May 13, 2015, provisional application No. 62/154,988, filed on Apr. 30, 2015.

(51) Int. Cl.
*H04W 76/30* (2018.01)
*H04W 76/16* (2018.01)
(Continued)

(52) U.S. Cl.
CPC ....... *H04W 76/30* (2018.02); *H04W 36/0022* (2013.01); *H04W 76/16* (2018.02);
(Continued)

(58) Field of Classification Search
None
See application file for complete search history.

(56) References Cited

U.S. PATENT DOCUMENTS 8,548,469 B1 * 10/2013 Hietalahti ............. H04W 60/04
370/328
2012/0087340 A1 * 4/2012 Yang ................. H04W 36/0022
370/331
(Continued)

OTHER PUBLICATIONS

"3GPP TS 23.272 V12.5.0; 3rd Generation Partnership Project; Technical Specification Group Services and System Aspects; Circuit Switched (CS) fallback in Evolved Packet System (EPS); Stage 2; Release 12;" Mar. 2015; pp. 1-100.
(Continued)

*Primary Examiner* — Christine T Duong
(74) *Attorney, Agent, or Firm* — Oblon, McClelland, Maier & Neustadt, L.L.P.

(57) ABSTRACT

A mobile communication device including a wireless transceiver and a controller is provided. The wireless transceiver performs wireless transmission and reception to and from a first network supporting only Packet-Switched (PS) services or a second network supporting Circuit-Switched (CS) services. The controller receives a rejection message of a Tracking Area Updating (TAU) procedure from the first network via the wireless transceiver when a Circuit Switch Fallback (CSFB)-related call originated from or terminated to the mobile communication device is pending, determines whether the rejection message includes a predetermined rejection cause, and in response to the rejection message including the predetermined rejection cause, selects the second network to make the CSFB-related call via the wireless transceiver without re-attaching to the first network.

14 Claims, 9 Drawing Sheets

(51) Int. Cl.
  *H04W 36/00* (2009.01)
  *H04W 76/18* (2018.01)
  *H04W 76/50* (2018.01)
  *H04W 60/00* (2009.01)
  *H04W 60/06* (2009.01)

(52) U.S. Cl.
  CPC .......... *H04W 60/005* (2013.01); *H04W 60/06* (2013.01); *H04W 76/18* (2018.02); *H04W 76/50* (2018.02)

(56) References Cited

U.S. PATENT DOCUMENTS

| | | | |
|---|---|---|---|
| 2013/0183965 A1* | 7/2013 | Ramachandran | H04W 48/20 455/434 |
| 2013/0329567 A1 | 12/2013 | Mathias et al. | |
| 2014/0355417 A1* | 12/2014 | Kim | H04W 24/04 370/221 |
| 2015/0011250 A1 | 1/2015 | Xu | |
| 2016/0212782 A1* | 7/2016 | Ko | H04W 68/005 |
| 2017/0230809 A1* | 8/2017 | Dm | H04W 4/90 |

OTHER PUBLICATIONS

"3GPP TS 24.301 V13.1.0; 3rd Generation Partnership Project; Technical Specification Group Core Network and Terminals; Non-Access-Stratum (NAS) protocol for Evolved Package System (EPS); Stage 3; Release 13;" Mar. 2015; pp. 1-384.

ZTE "MO CSFB handling when running T3346;" 3GPP TSG-CT WG1 Meeting #85; Nov. 2013; pp. 1-12.

"MO CSFB handling when running T3346, 3GPP TSG-CT WG1#85 C1-134619;" 3GPP TSG-CT WG1 Meeting #85; Nov. 2013; pp. 1-13.

"MO CSFB handling when running T3346, 3GPP TSG-CT WG1 #85 C1-134620;" b3GPP TSG-CT WG1 Meeting #85; Nov. 2013; pp. 1-13.

* cited by examiner

APPARATUSES AND METHODS FOR REDUCING CIRCUIT SWITCH FALLBACK (CSFB) CALL SETUP TIME

CROSS REFERENCE TO RELATED APPLICATIONS

This Application claims priority of U.S. Provisional Application No. 62/154,988, filed on Apr. 30, 2015, and U.S. Provisional Application No. 62/160,826, filed on May 13, 2015, the entireties of which are incorporated by reference herein.

BACKGROUND OF THE APPLICATION

Field of the Application

The application generally relates to Circuit Switch Fallback (CSFB), and more particularly, to apparatuses and methods for reducing CSFB call setup time.

Description of the Related Art

With growing demand for ubiquitous computing and networking, various Radio Access Technologies (RATs) have been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) 1× technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

To provide the user with convenience and flexibility, most User Equipment (UE) nowadays supports at least two RATs, and as such may be referred to as a multiple-RAT UE. Using a UE that supports both the WCDMA technology and the LTE technology as an example, it may selectively obtain wireless services using the WCDMA technology or the LTE technology. Generally, it selects an LTE network over a WCDMA network when wireless services are available from both service networks, since the LTE network may be more likely to provide wireless services with higher data throughput than the WCDMA network. Nonetheless, in some cases, a technique called Circuit-Switched Fallback (CSFB) may be employed for a multiple-RAT UE which is already camped on an LTE network to switch to a WCDMA network for accessing, particularly, Circuit-Switched (CS) services, e.g., a CS call. A CS call made utilizing the CSFB technique is generally referred to as a CSFB call.

According to the 3rd Generation Partnership Project (3GPP) Technical Specification (TS) 24.301, v13.1.0, when a multiple-RAT UE camped on an LTE network receives a TRACKING AREA UPDATE REJECT message with a certain rejection cause during the combined Tracking Area Updating (TAU) procedure, the multiple-RAT UE should perform the attach procedure with the LTE network. In the worst case, the multiple-RAT UE may have to retry the attach procedure up to four times if the attach procedure is not successfully completed, and there is a guard period to wait before each retry of the attach procedure. That is, the multiple-RAT UE may spend a long time retrying the attach procedure with the LTE network. However, there may be situations where a request for a CSFB call is received during the combined TAU procedure but before the TRACKING AREA UPDATE REJECT message. As a result, the processing of the request for the CSFB call may be seriously delayed due to the unsuccessful attach procedure.

BRIEF SUMMARY OF THE APPLICATION

In order to solve the aforementioned problem, the present application proposes to select another network capable of providing CS services as early as possible, without being delayed by performing the attach procedure in the PS-only network which may not be able to provide normal attach service.

In one aspect of the application, a mobile communication device comprising a wireless transceiver and a controller is provided. The wireless transceiver is configured to perform wireless transmission and reception to and from a first network supporting only PS services or a second network supporting CS services. The controller is configured to receive a rejection message of a TAU procedure from the first network via the wireless transceiver when a CSFB-related call originated from or terminated to the mobile communication device is pending, determine whether the rejection message comprises a predetermined rejection cause, and in response to the rejection message comprising the predetermined rejection cause, select the second network to make the CSFB-related call via the wireless transceiver without re-attaching to the first network.

In another aspect of the application, a method for reducing CSFB call setup time, which is executed by a mobile communication device, is provided. The method comprises the steps of: receiving a rejection message of a TAU procedure from a first network supporting only PS services when a CSFB-related call originated from or terminated to the mobile communication device is pending; determining whether the rejection message comprises a predetermined rejection cause; and in response to the rejection message comprising the predetermined rejection cause, selecting a second network supporting CS services to make the CSFB-related call without re-attaching to the first network.

In yet another aspect of the application, a mobile communication device comprising a wireless transceiver and a controller is provided. The wireless transceiver is configured to perform wireless transmission and reception to and from a first network supporting only PS services or a second network supporting CS services. The controller is configured to receive a rejection message of a TAU procedure from the first network via the wireless transceiver when a CSFB-related call originated from or terminated to the mobile communication device is pending, determine whether the rejection message comprises a rejection cause value of 9, 10 or 40, and in response to the rejection message comprising the rejection cause value of 9, 10 or 40, select the second network to make the CSFB-related call via the wireless transceiver without re-attaching to the first network.

Other aspects and features of the present application will become apparent to those with ordinarily skill in the art upon review of the following descriptions of specific embodiments of the mobile communication devices and the methods for reducing CSFB call setup time.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
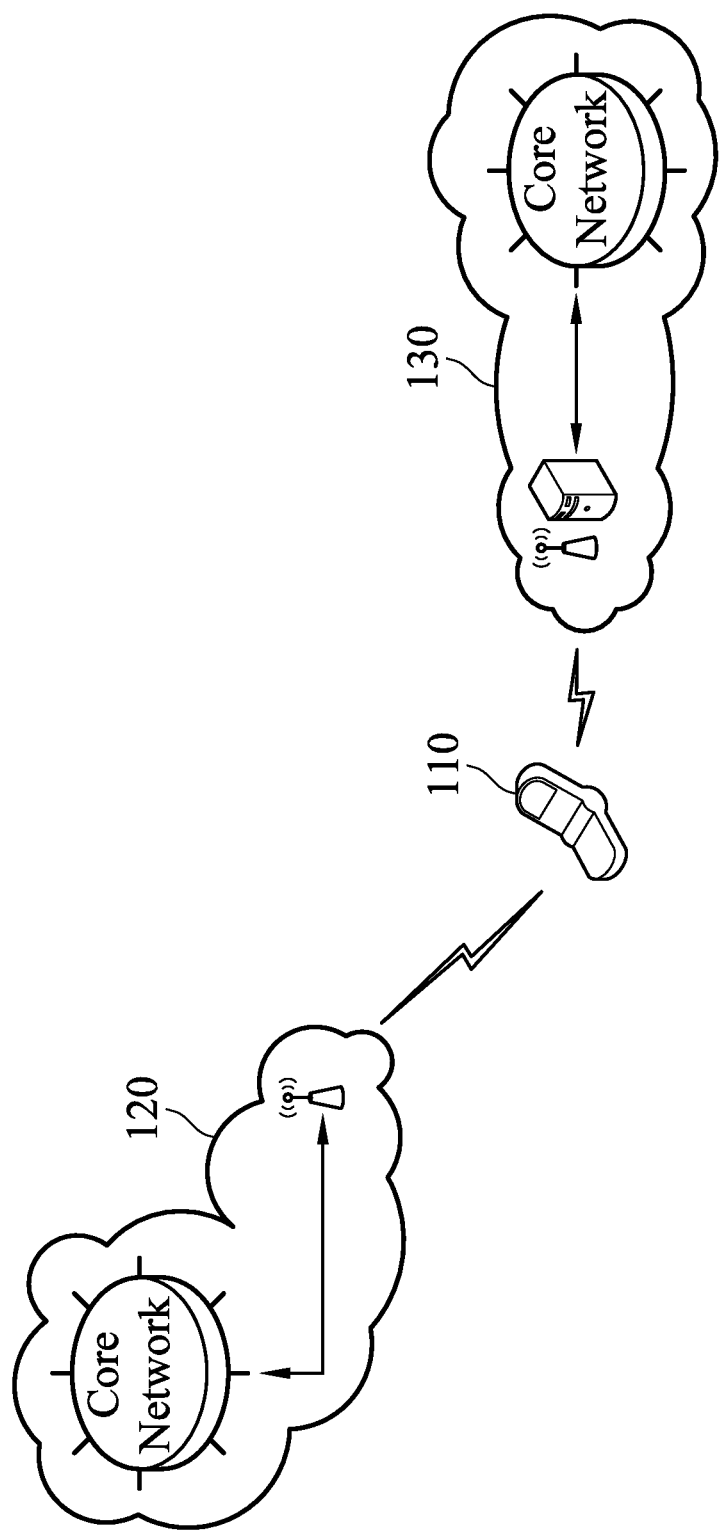
FIG. 1 is a block diagram illustrating a wireless communications environment according to an embodiment of the application.

FIG. 1 is a block diagram illustrating a wireless communications environment according to an embodiment of the application. The wireless communications environment 100 comprises a mobile communication device 110 and two service networks 120 and 130. The mobile communication device 110 may be a mobile phone, panel PC, notebook PC, or any portable computing device supporting the cellular technologies utilized by the service networks 120 and 130. Alternatively, the mobile communication device 110 may be an external data card for a computer host, notebook, or panel PC to obtain mobile services. The mobile communication device 110 may wirelessly communicate with one or both of the service networks 120 and 130 for obtaining mobile services, including Circuit-Switched (CS) and/or Packet-Switched (PS) services, wherein the CS services may include voice call services, and Short Message Service (SMS), etc., and the PS services may include Voice over IP (VoIP) service and data services, such as e-mail transmission, web browsing, file upload/download, instant messaging, streaming video, etc.

Each of the service networks 120 and 130 supports a respective RAT. Specifically, the service network 120 is an advanced network which supports only the PS services and the service network 130 is a legacy network which supports at least the CS services. For example, the service network 120 may be an LTE-based network or a PS service based network, such as an LTE network, an LTE-A network, a TD-LTE network, a 5G network, or a next generation network, while the service network 130 may be a GSM network, a GPRS network, an EDGE network, a WCDMA network, or a CDMA2000 1× network.

The service networks 120 and 130 may each comprise an access network and a core network. Using the service network 120 being an LTE/LTE-A/TD-LTE network as an example, the access network may be an Evolved-Universal Terrestrial Radio Access Network (E-UTRAN) which includes at least an evolved NB (eNB), and the core network may be an Evolved Packet Core (EPC) which includes at least a Home Subscriber Server (HSS), Mobility Management Entity (MME), Serving Gateway (S-GW), and Packet Data Network Gateway (PDN-GW or P-GW). Using the service network 130 being a GSM/GPRS/EDGE/WCDMA network as an example, the access network may be a GSM EDGE Radio Access Network (GERAN) which includes at least a Base Transceiver Station (BTS) and a Base Station Controller (BSC) or may be a UTRAN which includes at least a Node B and a Radio Network Controller (RNC), and the core network may be a GPRS core which includes at least a Mobile Switching Center (MSC), Home Location Register (HLR), Serving GPRS Support Node (SGSN), and Gateway GPRS Support Node (GGSN).

Alternatively, using the service network 130 being a CDMA2000 1× network as an example, the access network may include at least a BTS and a BSC, and the core network may include at least an MSC, HLR, Packet Data Serving Node (PDSN), and Home Agent (HA).

Figure 2:
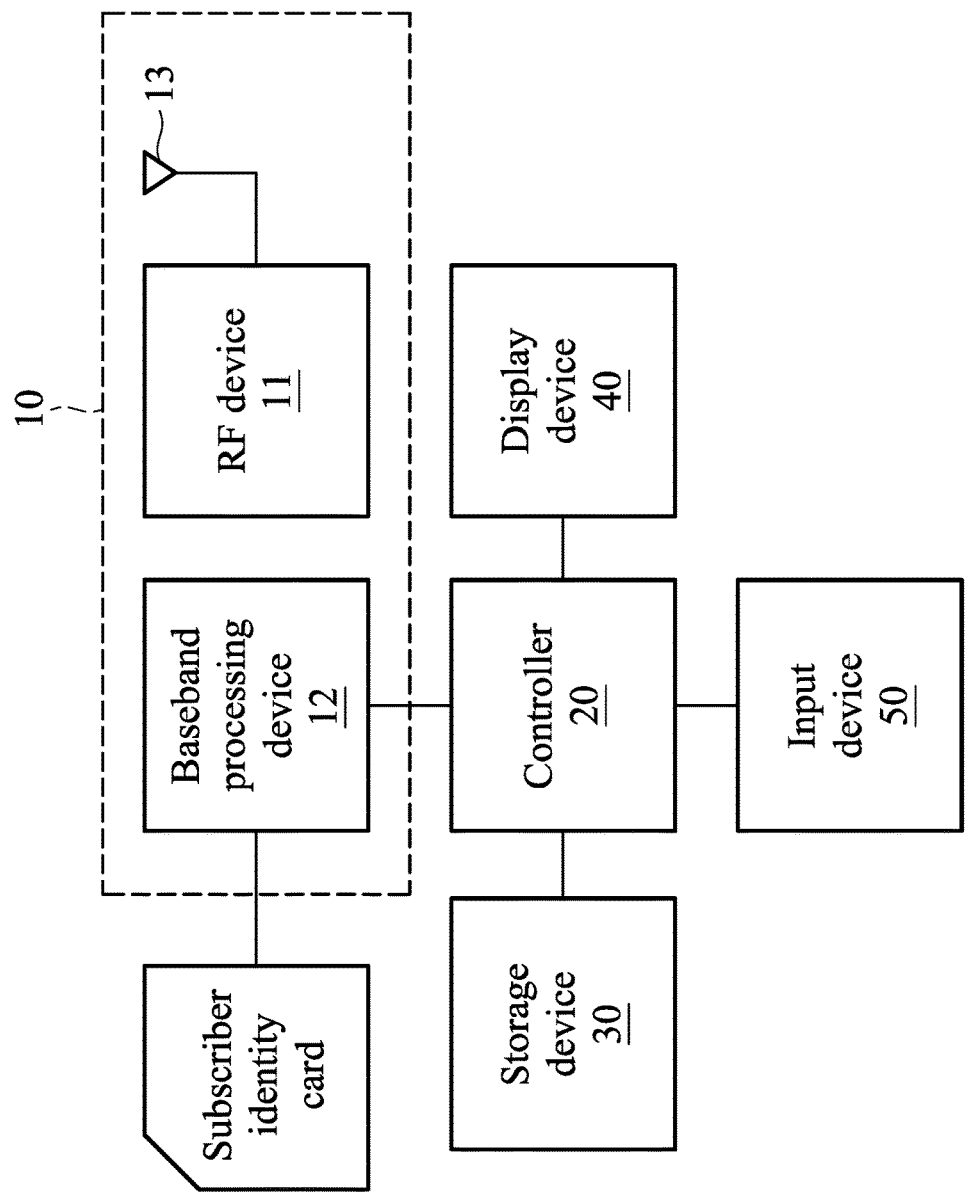
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service networks 120 and 130. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 450 MHz, 800 MHz or 1900 MHz utilized in CDMA2000 1× technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), or the like, for controlling the wireless transceiver 10 for wireless communications with the service networks 120 and 130, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for reducing CSFB call setup time.

In another embodiment, the controller 20 may be incorporated into the baseband processing device 12, serving as a baseband processor.

The storage device 30 may be a memory, such as a FLASH memory or a Non-volatile Random Access Memory (NVRAM), or a magnetic storage device, such as a hard disk or a magnetic tape, or an optical disc, or any combination thereof for storing cell information of legacy networks (e.g., the service network 130) and instructions and/or program code of applications and/or communication protocols.

The display device 40 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application.

Figure 3:
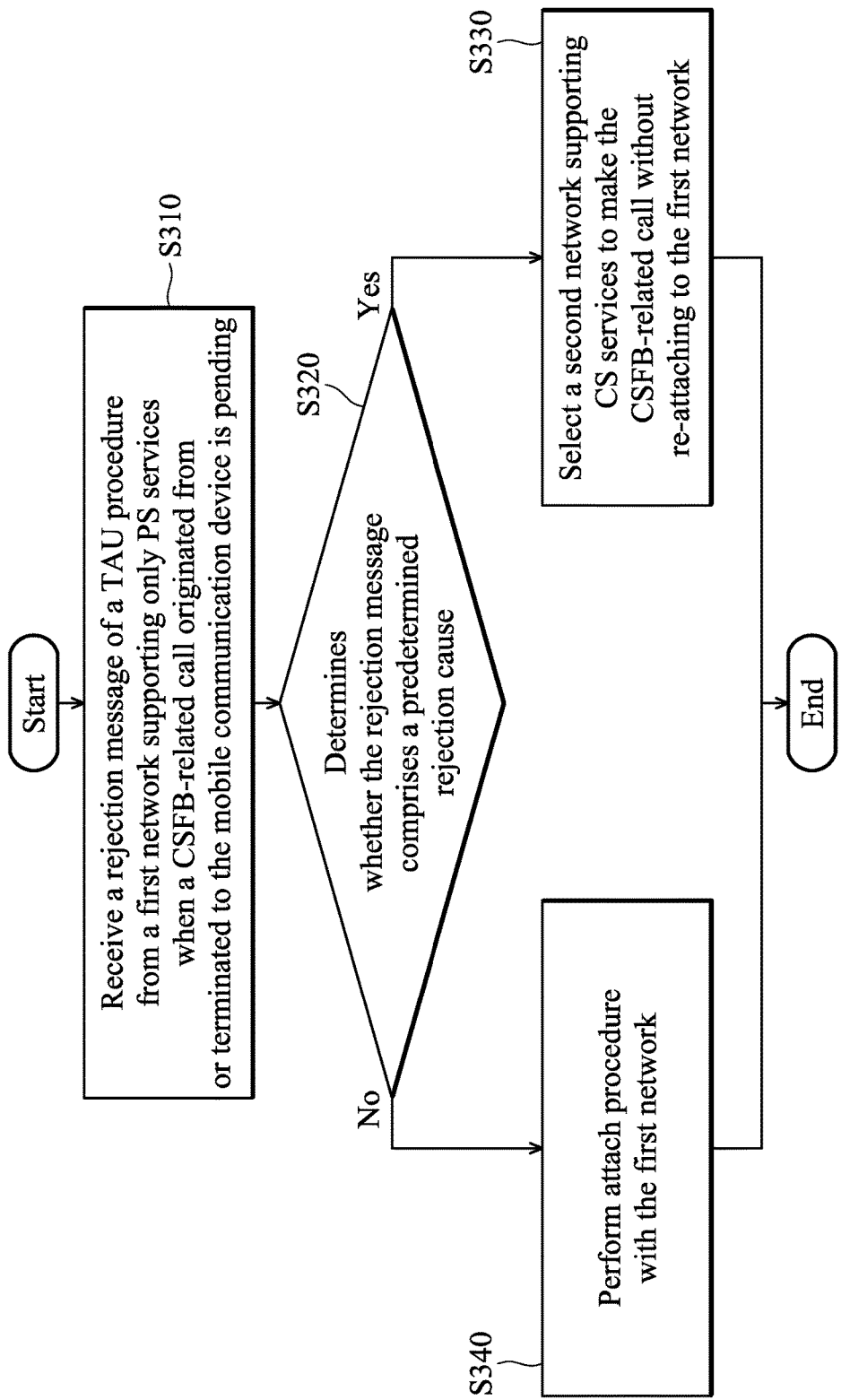
FIG. 3 is a flow chart illustrating the method for reducing CSFB call setup time according to an embodiment of the application.

FIG. 3 is a flow chart illustrating the method for reducing CSFB call setup time according to an embodiment of the application. In this embodiment, the method is applied to a mobile communication device, such as the mobile communication device 110. To begin, the mobile communication device receives a rejection message of a TAU procedure from a first network supporting only PS services when a CSFB-related call originated from or terminated to the mobile communication device is pending (step S310). Specifically, the first network is an LTE-based network, such as an LTE network, LTE-A network, or TD-LTE network, and the rejection message is a TRACKING AREA UPDATE REJECT message. The pending of the CSFB-related call refers to a situation where the request for the CSFB-related call has been initiated during the TAU procedure but before the rejection message is received.

To further clarify, the CSFB-related call originated from the mobile communication device may be referred to as a Mobile Originated (MO) CSFB-related call, while the CSFB-related call terminated to the mobile communication device may be referred to as a Mobile Terminated (MT) CSFB-related call.

In one embodiment, the CSFB-related call is a CSFB call or a CSFB emergency call. In another embodiment, the CSFB-related call is a 1×CSFB call, or a 1×CSFB emergency call.

Next, the mobile communication device determines whether the rejection message comprises a predetermined rejection cause (step S320). Specifically, the predetermined rejection cause comprises a cause value of 9, 10, or 40, each of which indicates that the mobile communication device is unable to obtain PS services from the first network and/or that the mobile communication device needs to perform the attach procedure immediately.

In one embodiment, the rejection cause with a cause value of 9 indicates that the UE identity of the mobile communication device cannot be derived by the first network.

In another embodiment, the rejection cause with a cause value of 10 indicates that the mobile communication device is implicitly detached from the first network.

In yet another embodiment, the rejection cause with a cause value of 40 indicates that no Evolved Packet System (EPS) bearer context is activated.

Subsequently, in response to the rejection message comprising the predetermined rejection cause, the mobile communication device selects a second network supporting CS services to make the CSFB-related call without re-attaching to the first network (step S330), and the method ends. For example, the second network may be a GSM network, GPRS network, EDGE network, WCDMA network, or CDMA2000 1× network.

Otherwise, in response to the rejection message not comprising the predetermined rejection cause (i.e., the predetermined rejection cause comprises a cause value other than 9, 10, and 40), the mobile communication device performs the attach procedure with the first network (step S340), and the method ends.

Figure 4:
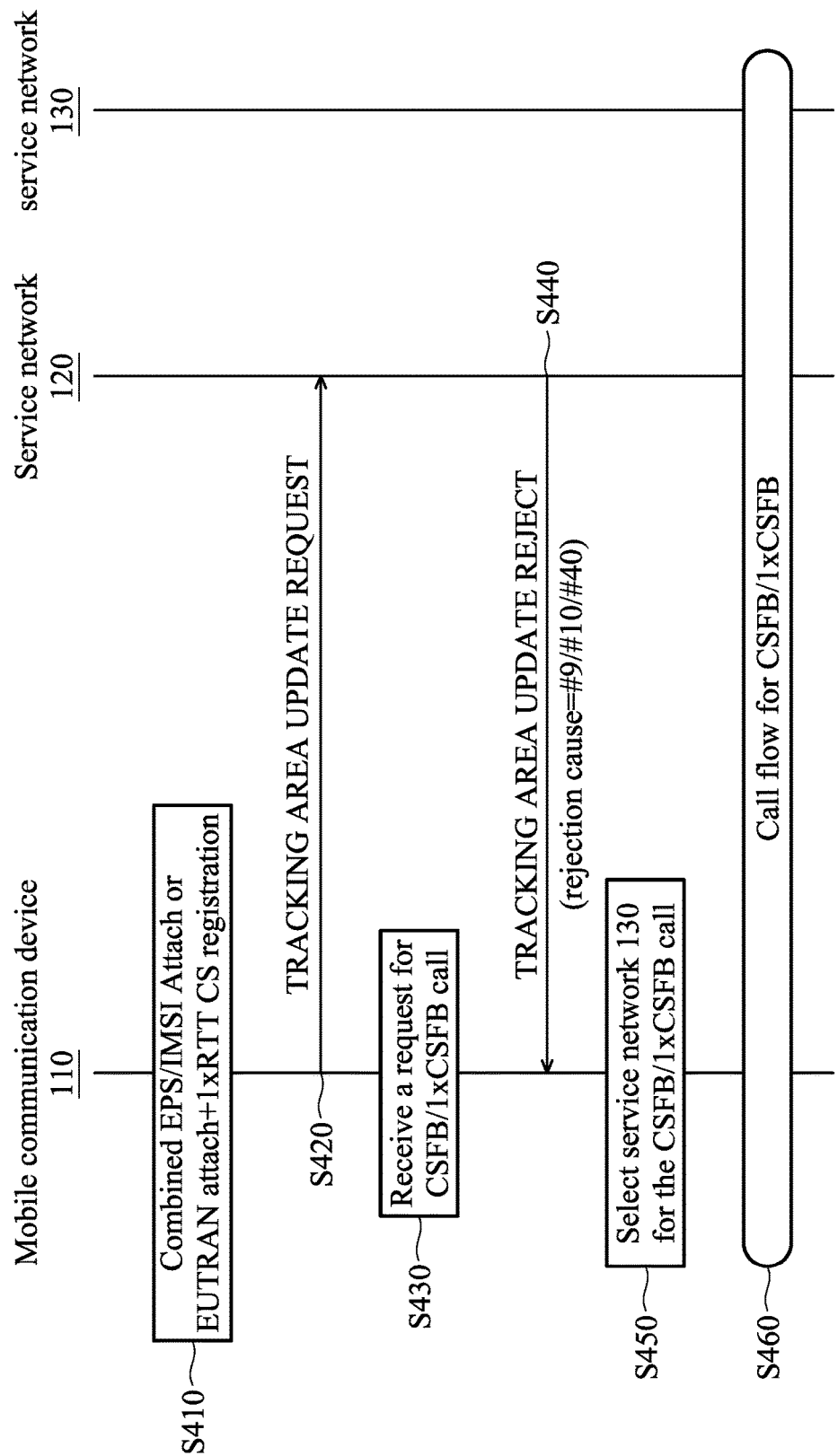
FIG. 4 is a message sequence chart illustrating the processing of an MO CSFB or 1×CSFB call during a combined TAU procedure according to an embodiment of the application.

FIG. 4 is a message sequence chart illustrating the processing of an MO CSFB or 1×CSFB call during a combined TAU procedure according to an embodiment of the application. In this embodiment, the service network 120 is an LTE-based network, while the service network 130 is a GSM/GPRS/EDGE/WCDMA/CDMA2000 1× network. To begin, the mobile communication device 110 is registered with the service network 120 with the combined attach type "Combined EPS/IMSI Attach" or "EUTRAN attach+1×RTT CS registration" which means that the mobile communication device 110 is simultaneously registered with both the service networks 120 and 130 through the service network 120 (step 410). Next, the mobile communication device 110 starts a combined TAU procedure by transmitting a TRACKING AREA UPDATE REQUEST message to the service network 120 (step S420).

Before receiving any response from the service network 120, the mobile communication device 110 receives a request for making a CSFB or 1×CSFB call (step S430). Subsequently, the mobile communication device 110 receives a TRACKING AREA UPDATE REJECT message with a rejection cause of value #9, #10, or #40 from the service network 120 (step S440).

Due to the rejection cause of value #9, #10, or #40, the mobile communication device 110 selects the service network 130 to make the CSFB or 1×CSFB call (step S450), instead of staying in the service network 120 to perform the attach procedure.

After that, the mobile communication device 110 proceeds with the call flow for CSFB or 1×CSFB with the service networks 120 and 130 (step S460). Please note that the detailed description of the call flow for CSFB or 1×CSFB call is omitted herein for brevity since it is beyond the scope of the application, and reference may be made to the 3GPP TS 23.272, v13.1.0.

Figure 5:
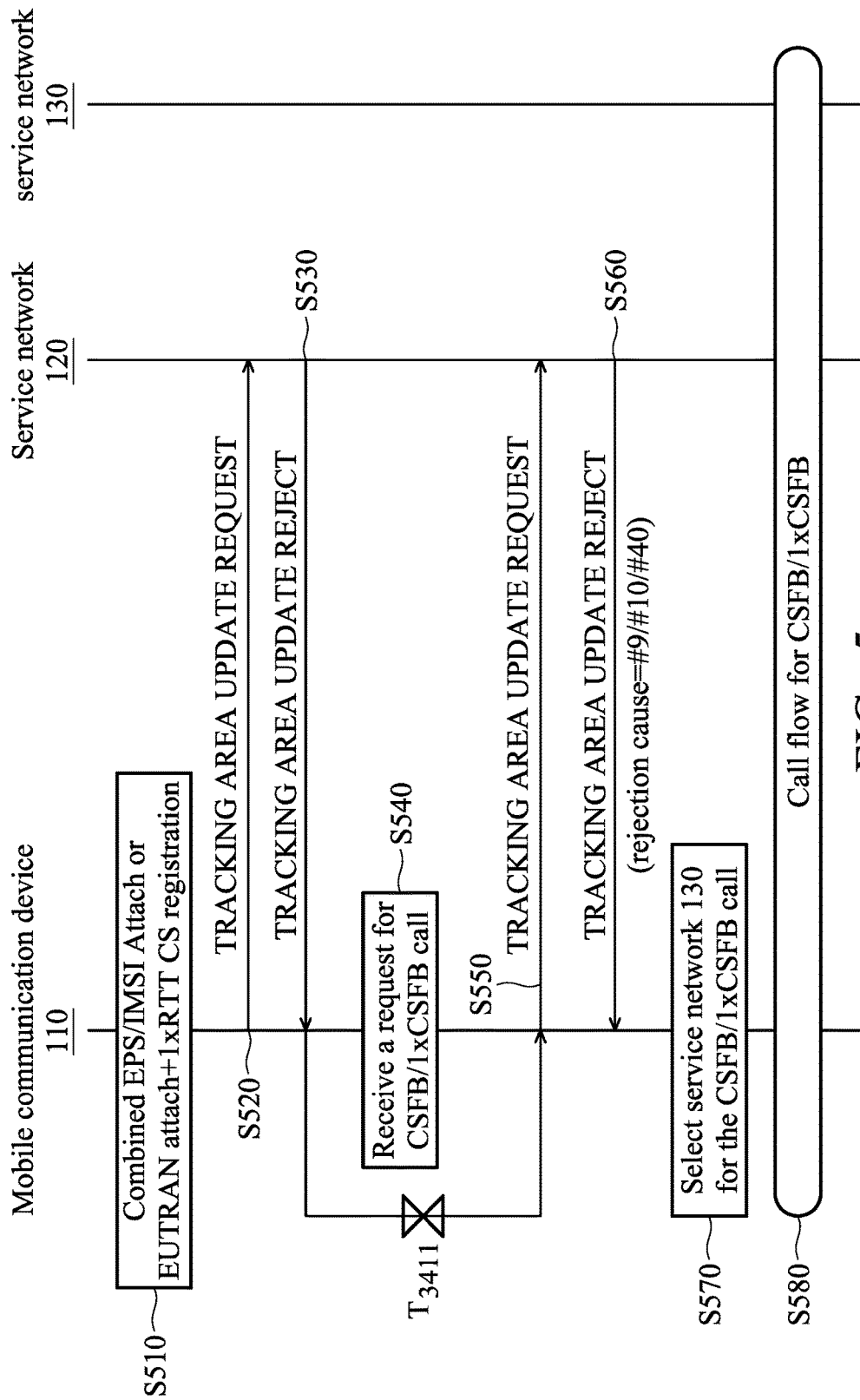
FIG. 5 is a message sequence chart illustrating the processing of an MO CSFB or 1×CSFB call during a combined TAU procedure according to another embodiment of the application.

FIG. 5 is a message sequence chart illustrating the processing of an MO CSFB or 1×CSFB call during a combined TAU procedure according to another embodiment of the application. In this embodiment, the service network 120 is an LTE-based network, while the service network 130 is a GSM/GPRS/EDGE/WCDMA/CDMA2000 1× network. To begin, the mobile communication device 110 is registered with the service network 120 with the combined attach type "Combined EPS/IMSI Attach" or "EUTRAN attach+1×RTT CS registration" which means that the mobile communication device 110 is simultaneously registered with both the service networks 120 and 130 through the service network 120 (step 510). Next, the mobile communication device 110 starts a combined TAU procedure by transmitting a TRACKING AREA UPDATE REQUEST message to the service network 120 (step S520). Subsequently, the mobile communication device 110 receives a TRACKING AREA UPDATE REJECT message from the service network 120 (step S530).

In response to the TRACKING AREA UPDATE REJECT message, a timer T3411 is started to wait till the next retry. During the countdown of the timer T3411, the mobile communication device 110 receives a request for making a CSFB or 1×CSFB call (step S540).

After that, when the timer T3411 expires, the mobile communication device 110 retries the combined TAU procedure by transmitting a TRACKING AREA UPDATE REQUEST message to the service network 120 (step S550). Subsequently, the mobile communication device 110 receives a TRACKING AREA UPDATE REJECT message with a rejection cause of value #9, #10, or #40 from the service network 120 (step S560).

Due to the rejection cause of value #9, #10, or #40, the mobile communication device 110 selects the service network 130 to make the CSFB or 1×CSFB call (step S570), instead of staying in the service network 120 to perform the attach procedure.

After that, the mobile communication device 110 proceeds with the call flow for CSFB or 1×CSFB with the service networks 120 and 130 (step S580).

Figure 6:
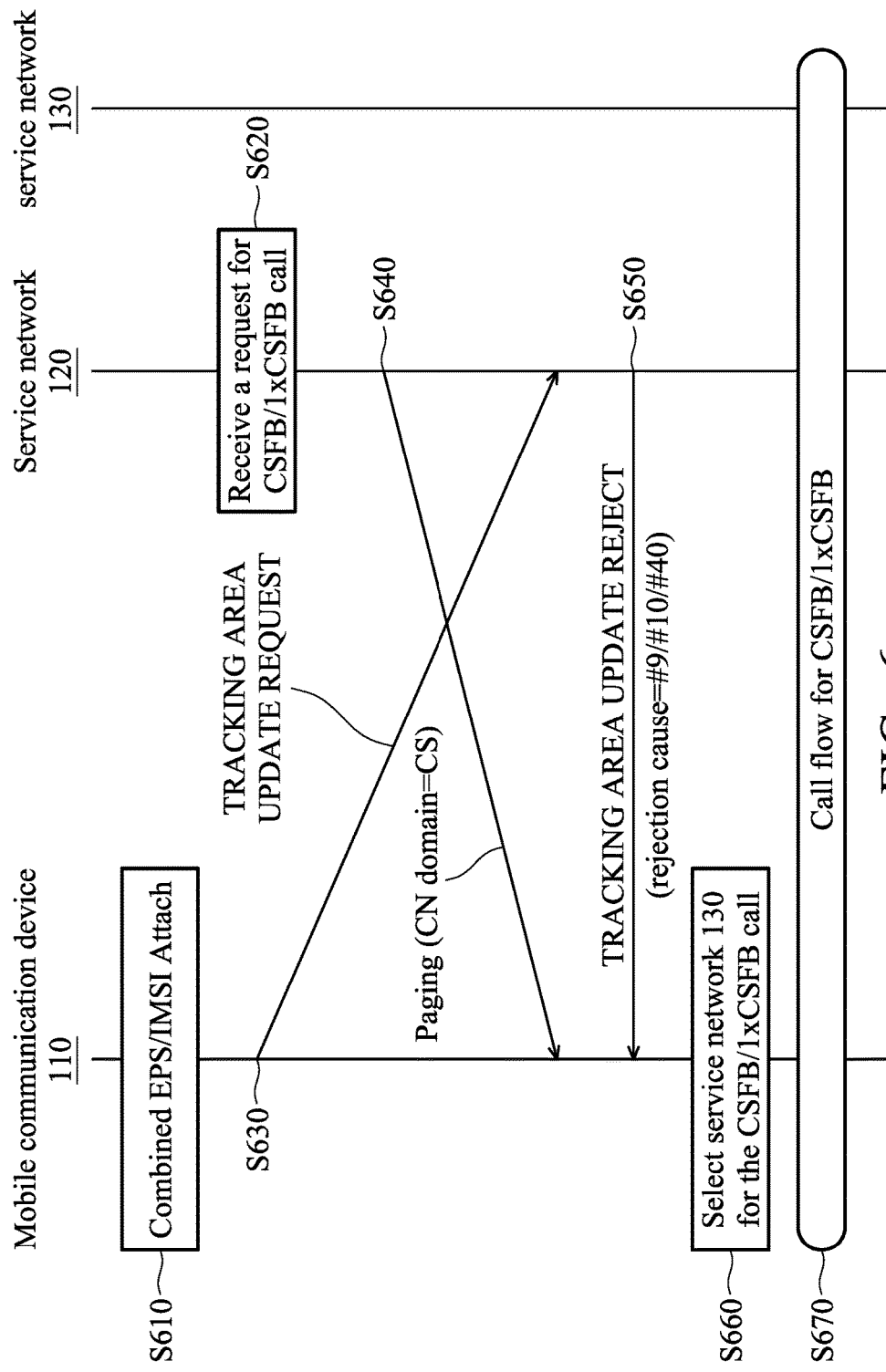
FIG. 6 is a message sequence chart illustrating the processing of an MT CSFB call during a combined TAU procedure according to an embodiment of the application.

FIG. 6 is a message sequence chart illustrating the processing of an MT CSFB call during a combined TAU procedure according to an embodiment of the application. In this embodiment, the service network 120 is an LTE-based network, while the service network 130 is a GSM/GPRS/EDGE/WCDMA network. To begin, the mobile communication device 110 is registered with the service network 120 with the combined attach type "Combined EPS/IMSI Attach" which means that the mobile communication device 110 is simultaneously registered with both the service networks 120 and 130 through the service network 120 (step 610). Next, the service network 120 receives a request for making a CSFB call to the mobile communication device 110 (step S620).

Around the same time when the service network 120 receives the request for the CSFB call, the mobile communication device 110 starts a combined TAU procedure by transmitting a TRACKING AREA UPDATE REQUEST message to the service network 120 (step S630).

In response to the request, the service network 120 transmits a paging message with a CN domain indicator set to "CS" to the mobile communication device 110 (step S640), as the state of the mobile communication device 110 is the EMM-IDLE mode in this embodiment.

Please note that, due to the time required for delivery over the air, the mobile communication device 110 receives the paging message after the combined TAU procedure has been started. Thus, the CSFB call is put on hold (i.e., the CSFB call is pending) since the combined TAU procedure is ongoing.

Subsequently, the mobile communication device 110 receives a TRACKING AREA UPDATE REJECT message with a rejection cause of value #9, #10, or #40 from the service network 120 (step S650).

Due to the rejection cause of value #9, #10, or #40, the mobile communication device 110 selects the service network 130 to make the CSFB call (step S660), instead of staying in the service network 120 to perform the attach procedure.

After that, the mobile communication device 110 proceeds with the call flow for CSFB with the service networks 120 and 130 (step S670).

Figure 7:
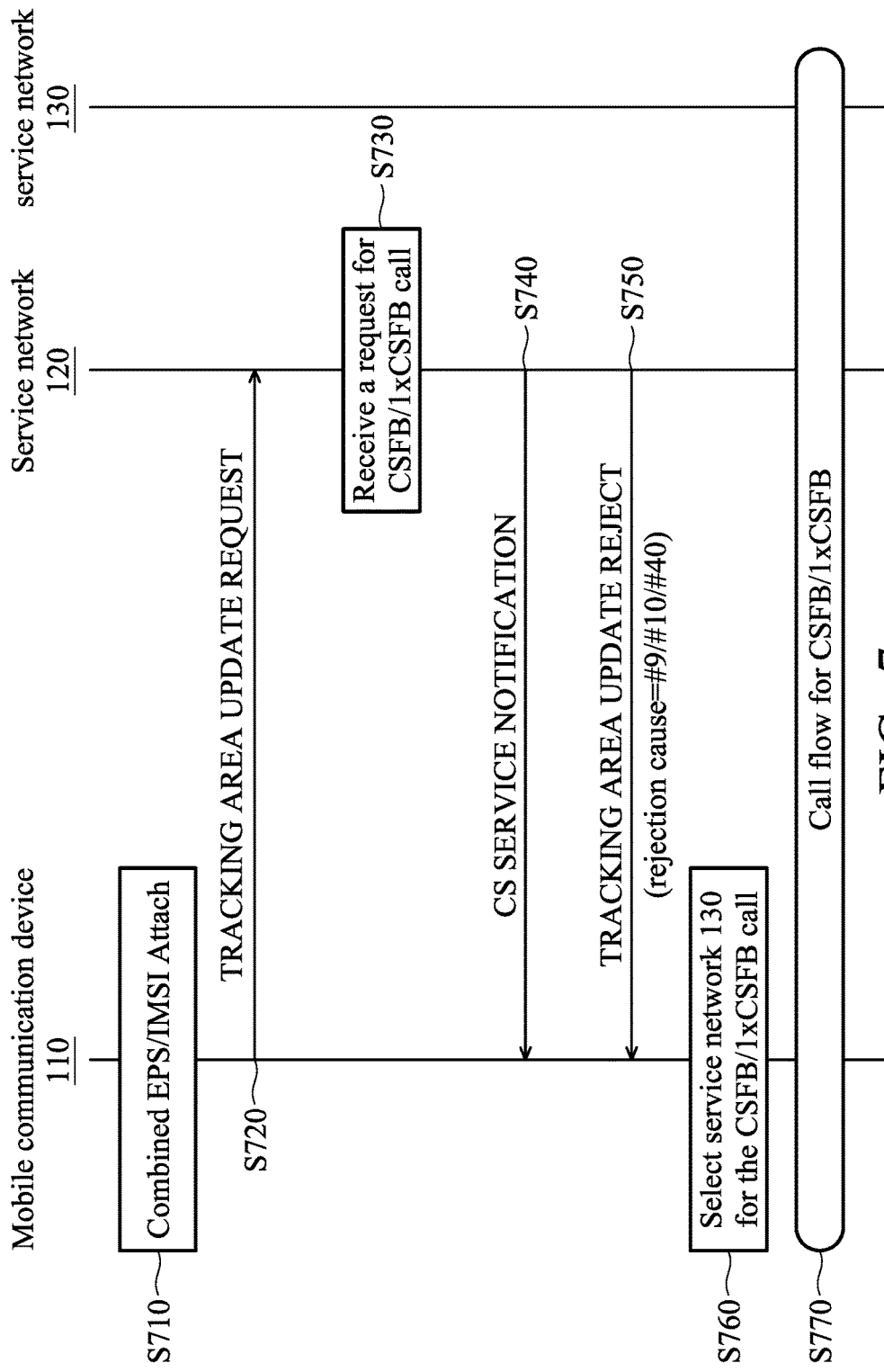
FIG. 7 is a message sequence chart illustrating the processing of an MT CSFB call during a combined TAU procedure according to another embodiment of the application.

FIG. 7 is a message sequence chart illustrating the processing of an MT CSFB call during a combined TAU procedure according to another embodiment of the application. In this embodiment, the service network 120 is an LTE-based network, while the service network 130 is a GSM/GPRS/EDGE/WCDMA network. To begin, the mobile communication device 110 is registered with the service network 120 with the combined attach type "Combined EPS/IMSI Attach" which means that the mobile communication device 110 is simultaneously registered with both the service networks 120 and 130 through the service network 120 (step 710). Next, the mobile communication device 110 starts a combined TAU procedure by transmitting a TRACKING AREA UPDATE REQUEST message to the service network 120 (step S720).

Before the service network 120 responds to the TRACKING AREA UPDATE REQUEST message, it receives a request for making a CSFB call to the mobile communication device 110 (step S730). In response to the request, the service network 120 transmits a CS SERVICE NOTIFICATION message to the mobile communication device 110 (step S740), as the state of the mobile communication device 110 is the EMM-CONNECTED mode in this embodiment.

Subsequently, the mobile communication device 110 receives a TRACKING AREA UPDATE REJECT message with a rejection cause of value #9, #10, or #40 from the service network 120 (step S750).

Due to the rejection cause of value #9, #10, or #40, the mobile communication device 110 selects the service network 130 to make the CSFB call (step S760), instead of staying in the service network 120 to perform the attach procedure.

After that, the mobile communication device 110 proceeds with the call flow for CSFB with the service networks 120 and 130 (step S770).

Figure 8:
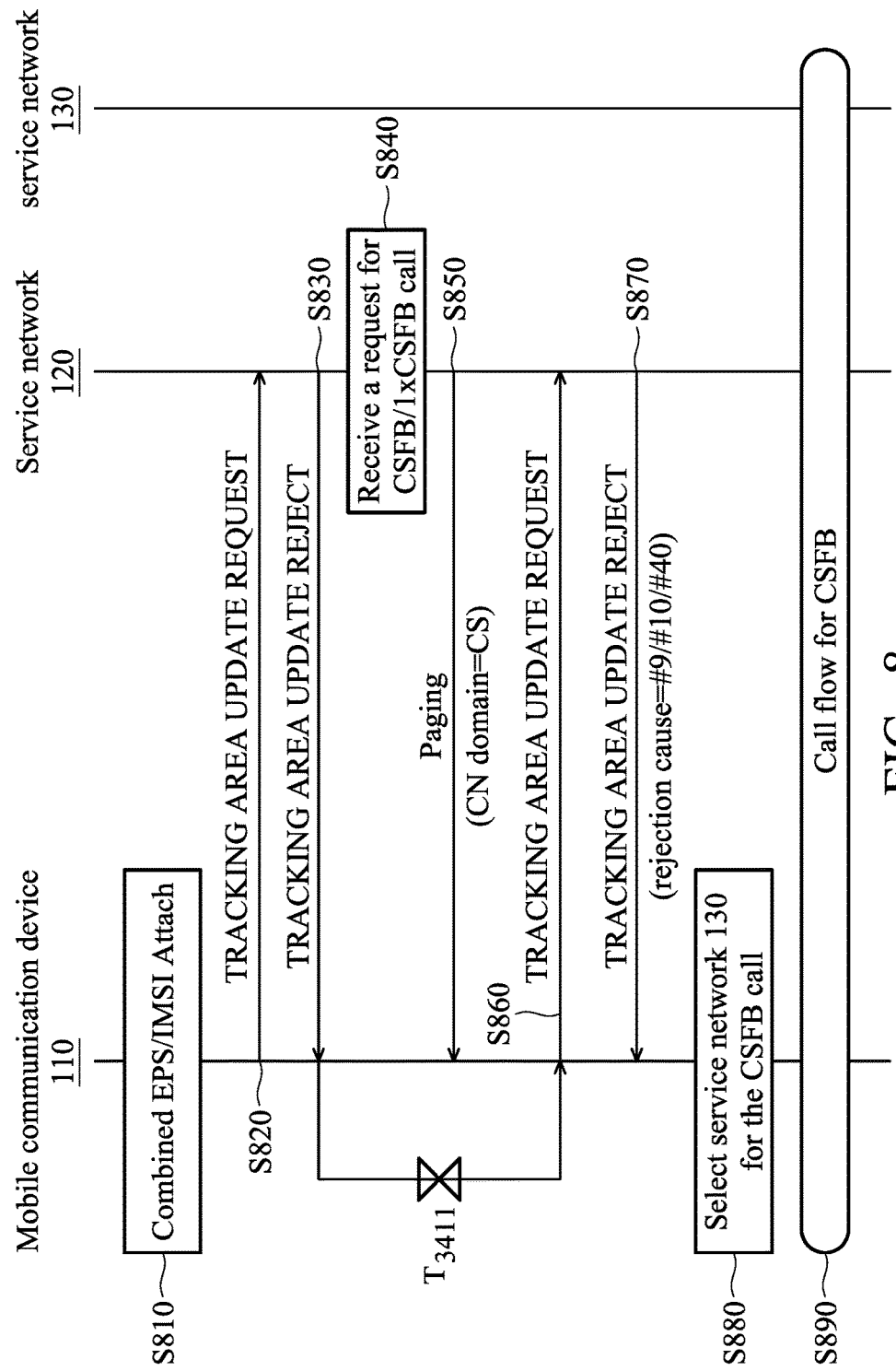
FIG. 8 is a message sequence chart illustrating the processing of an MT CSFB call during a combined TAU procedure according to yet another embodiment of the application.

FIG. 8 is a message sequence chart illustrating the processing of an MT CSFB call during a combined TAU procedure according to yet another embodiment of the application. In this embodiment, the service network 120 is an LTE-based network, while the service network 130 is a GSM/GPRS/EDGE/WCDMA network. To begin, the mobile communication device 110 is registered with the service network 120 with the combined attach type "Combined EPS/IMSI Attach" which means that the mobile communication device 110 is simultaneously registered with both the service networks 120 and 130 through the service network 120 (step 810). Next, the mobile communication device 110 starts a combined TAU procedure by transmitting a TRACKING AREA UPDATE REQUEST message to the service network 120 (step S820). Subsequently, the mobile communication device 110 receives a TRACKING AREA UPDATE REJECT message from the service network 120 (step S830).

In response to the TRACKING AREA UPDATE REJECT message, a timer T3411 is started to wait till the next retry. During the countdown of the timer T3411, the service network 120 receives a request for making a CSFB call (step S840), and then transmits a paging message with a CN domain indicator set to "CS" to the mobile communication device 110 (step S850), as the state of the mobile communication device 110 is the EMM-IDLE mode in this embodiment.

After that, when the timer T3411 expires, the mobile communication device 110 retries the combined TAU procedure by transmitting a TRACKING AREA UPDATE REQUEST message to the service network 120 (step S860). Subsequently, the mobile communication device 110 receives a TRACKING AREA UPDATE REJECT message with a rejection cause of value #9, #10, or #40 from the service network 120 (step S870).

Due to the rejection cause of value #9, #10, or #40, the mobile communication device 110 selects the service network 130 to make the CSFB call (step S880), instead of staying in the service network 120 to perform the attach procedure.

After that, the mobile communication device 110 proceeds with the call flow for CSFB with the service networks 120 and 130 (step S890).

Figure 9:
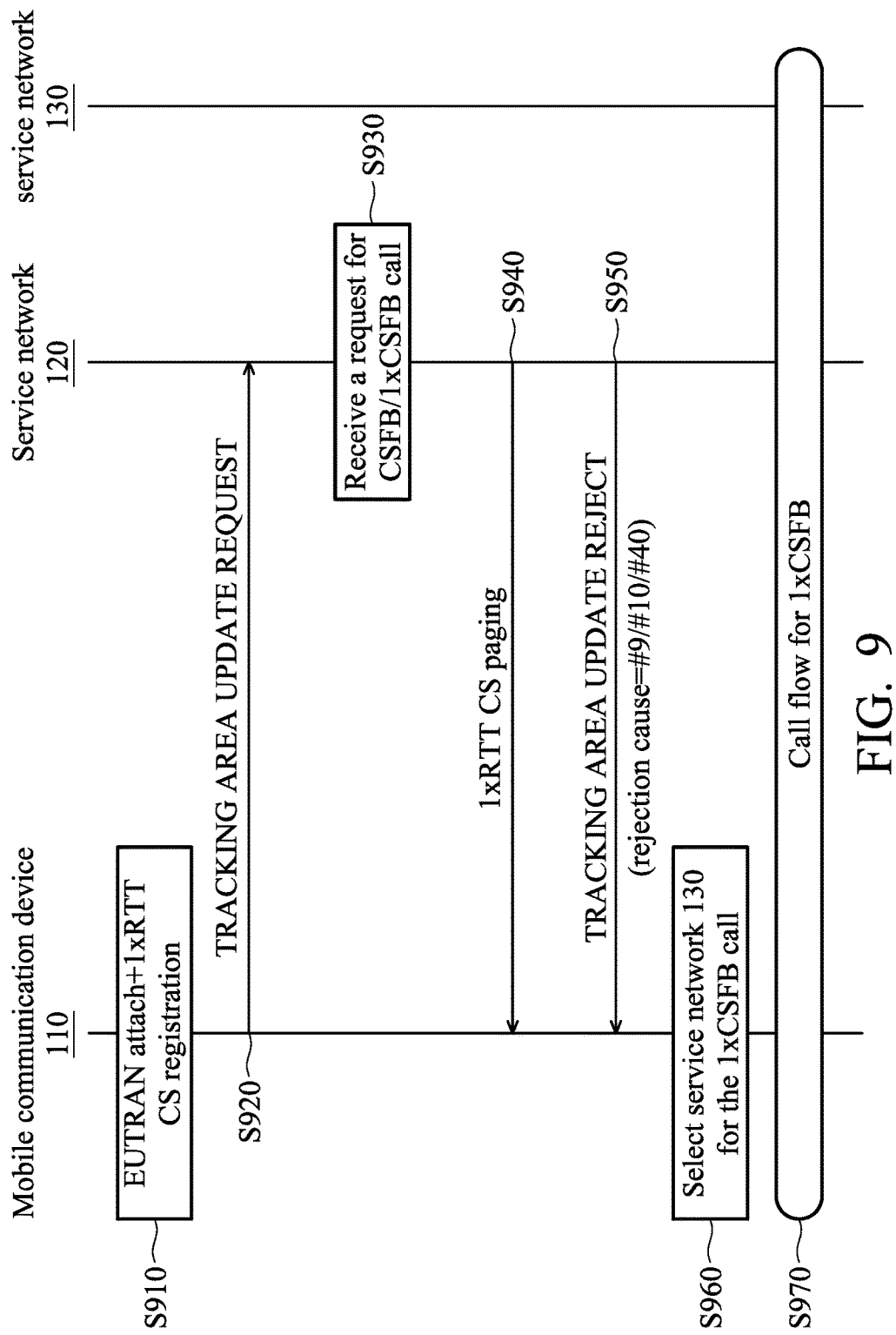
FIG. 9 is a message sequence chart illustrating the processing of an MT 1×CSFB call during a combined TAU procedure according to an embodiment of the application.

FIG. 9 is a message sequence chart illustrating the processing of an MT 1×CSFB call during a combined TAU procedure according to an embodiment of the application. In this embodiment, the service network 120 is an LTE-based network, while the service network 130 is a CDMA2000 1× network. To begin, the mobile communication device 110 is registered with the service network 120 with the combined attach type "EUTRAN attach+1xRTT CS registration" which means that the mobile communication device 110 is simultaneously registered with both the service networks 120 and 130 through the service network 120 (step 910). Next, the mobile communication device 110 starts a combined TAU procedure by transmitting a TRACKING AREA UPDATE REQUEST message to the service network 120 (step S920).

Before the service network 120 responds to the TRACKING AREA UPDATE REQUEST message, it receives a request for making a 1×CSFB call to the mobile communication device 110 (step S930). In response to the request, the service network 120 transmits a 1×RTT CS paging message to the mobile communication device 110 (step S940).

Subsequently, the mobile communication device 110 receives a TRACKING AREA UPDATE REJECT message with a rejection cause of value #9, #10, or #40 from the service network 120 (step S950).

Due to the rejection cause of value #9, #10, or #40, the mobile communication device 110 selects the service network 130 to make the 1×CSFB call (step S960), instead of staying in the service network 120 to perform the attach procedure.

After that, the mobile communication device 110 proceeds with the call flow for 1×CSFB with the service networks 120 and 130 (step S970).

It should be noted that, in the embodiments of FIGS. 6 to 9, before the request for the CSFB/1×CSFB call is received by the service network 120, there may be other signaling communications between the service networks 120 and 130. However, the detailed description of those signaling communications is omitted herein for brevity since it is beyond the scope of the application, and reference may be made to the 3GPP TS 23.272, v13.1.0.

In view of the forgoing embodiment of FIGS. 3 to 9, it will be appreciated that the present application reduces CSFB/1×CSFB call setup time during a combined TAU procedure rejected with a cause value of 9, 10, or 40, by allowing the UE to select another network capable of providing CS services instead of re-attaching to the PS-only network. Advantageously, the time which is used to be spent on re-attaching to the PS-only network may be saved and the CSFB/1×CSFB call may be made as soon as possible.

While the application has been described by way of example and in terms of preferred embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device, comprising:
a wireless transceiver, configured to perform wireless transmission and reception to and from a first network supporting only Packet-Switched (PS) services or a second network supporting Circuit-Switched (CS) services; and
a controller, configured to receive, from the first network via the wireless transceiver, a rejection message of a Tracking Area Updating (TAU) procedure which is initiated before receiving a request or paging for a Circuit Switch Fallback (CSFB)-related call originated from or terminated to the mobile communication device, when the CSFB-related call is pending, determine whether the rejection message of the TAU procedure comprises a rejection cause with a cause value of 9, 10 or 40 defined in 3rd Generation Partnership Project (3GPP) specifications for a Long Term Evolution (LTE)-based technology, and in response to the rejection message of the TAU procedure comprising the rejection cause with the cause value of 9, 10 or 40 defined in 3GPP specifications for the LTE-based technology, select the second network to make the CSFB-related call via the wireless transceiver without re-attaching to the first network.

2. The mobile communication device of claim 1, wherein the CSFB-related call is a CSFB call, a CSFB emergency call, a 1×CSFB call, or a 1×CSFB emergency call.

3. The mobile communication device of claim 1, wherein the first network is a Long Term Evolution (LTE)-based network, and the second network is a Global System for Mobile Communications (GSM) network, a General Packet Radio Service (GPRS) network, an Enhanced Data rates for Global Evolution (EDGE) network, a Wideband Code Division Multiple Access (WCDMA) network, or a Code Division Multiple Access 2000 (CDMA2000) 1× network.

4. The mobile communication device of claim 1, wherein the rejection message is a TRACKING AREA UPDATE REJECT message.

5. The mobile communication device of claim 1, wherein the cause value of 9 indicates that a User Equipment (UE) identity of the mobile communication device cannot be derived by the first network.

6. The mobile communication device of claim 1, wherein the cause value of 10 indicates that the mobile communication device is implicitly detached from the first network.

7. The mobile communication device of claim 1, wherein the cause value of 40 indicates that no Evolved Packet System (EPS) bearer context is activated.

8. A method for reducing Circuit Switch Fallback (CSFB) call setup time, which is executed by a mobile communication device, the method comprising:
receiving, from a first network supporting only Packet-Switched (PS) services, a rejection message of a Tracking Area Updating (TAU) procedure which is initiated before receiving a request or paging for a CSFB-related call originated from or terminated to the mobile communication device, when the CSFB-related call is pending;

determining whether the rejection message of the TAU procedure comprises a rejection cause with a cause value of 9, 10 or 40 defined in 3rd Generation Partnership Project (3GPP) specifications for a Long Term Evolution (LTE)-based technology; and in response to the rejection message of the TAU procedure comprising the rejection cause with the cause value of 9, 10 or 40 defined in 3GPP specifications for the LTE-based technology, selecting a second network supporting Circuit-Switched (CS) services to make the CSFB-related call without re-attaching to the first network.

9. The method of claim 8, wherein the CSFB-related call is a CSFB call, a CSFB emergency call, a 1×CSFB call, or a 1×CSFB emergency call.

10. The method of claim 8, wherein the first network is a Long Term Evolution (LTE)-based network, and the second network is a Global System for Mobile Communications (GSM) network, a General Packet Radio Service (GPRS) network, an Enhanced Data rates for Global Evolution (EDGE) network, a Wideband Code Division Multiple Access (WCDMA) network, or a Code Division Multiple Access 2000 (CDMA2000) 1× network.

11. The method of claim 8, wherein the rejection message is a TRACKING AREA UPDATE REJECT message.

12. The method of claim 8, wherein the cause value of 9 indicates that a User Equipment (UE) identity of the mobile communication device cannot be derived by the first network.

13. The method of claim 8, wherein the cause value of 10 indicates that the mobile communication device is implicitly detached from the first network.

14. The method of claim 8, wherein the cause value of 40 indicates that no Evolved Packet System (EPS) bearer context is activated.

* * * * *